(12) United States Patent
Houssian

(10) Patent No.: US 7,178,282 B2
(45) Date of Patent: Feb. 20, 2007

(54) DECORATIVE CORNER PIECE FOR CONNECTING MITERED FRAME SECTIONS TOGETHER

(75) Inventor: Vazgen Houssian, Union City, NJ (US)

(73) Assignee: Nielsen & Bainbridge LLC, Paramus, NJ (US)

( * ) Notice: Subject to any disclaimer, the term of this patent is extended or adjusted under 35 U.S.C. 154(b) by 0 days.

(21) Appl. No.: 10/939,320

(22) Filed: Sep. 9, 2004

(65) Prior Publication Data

US 2005/0102879 A1 May 19, 2005

Related U.S. Application Data

(60) Provisional application No. 60/501,267, filed on Sep. 9, 2003.

(51) Int. Cl.
*A47G 1/10* (2006.01)

(52) U.S. Cl. .......................... 40/785; 403/401
(58) Field of Classification Search .............. 40/782, 40/783, 784, 785; 403/401, 402, 403
See application file for complete search history.

(56) References Cited

U.S. PATENT DOCUMENTS

| 958,316 | A | * | 5/1910 | Rogers et al. | ............... 403/402 |
| 4,827,648 | A | * | 5/1989 | Danin | ......................... 40/783 |
| 6,339,891 | B1 | * | 1/2002 | Cox | ........................... 40/785 |

* cited by examiner

*Primary Examiner*—Joanne Silbermann
(74) *Attorney, Agent, or Firm*—Darby & Darby

(57) ABSTRACT

A decorative piece for securing together the mitered edges of two frame sections, comprises a locking plate having two threaded apertures for receiving tightening screws, and a backing plate, whereby tightening of the screws forces the locking plate and backing plate apart to clamp the frame sections together. A cosmetic extension attached to one of the plates is adapted to fit between the mitered edges of the adjacent frame sections. The cosmetic extension includes a top portion and a transverse extension arm which provide an attractive junction for the adjacent frame sections which obscures the mitered joint.

6 Claims, 2 Drawing Sheets

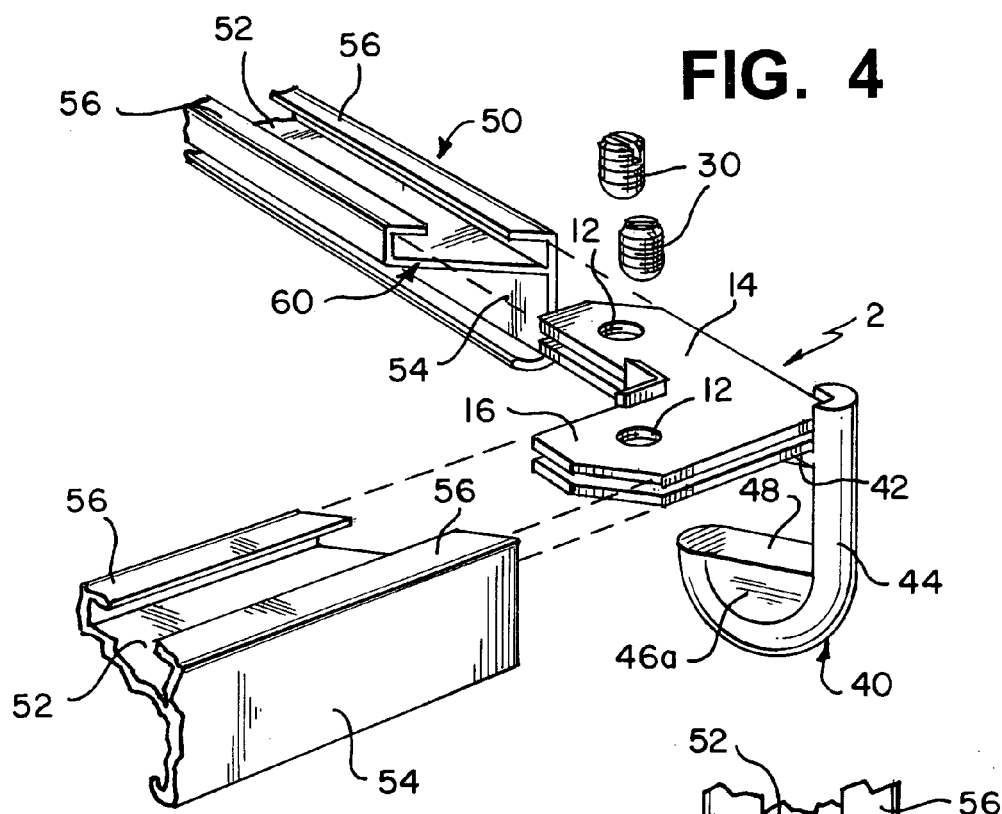
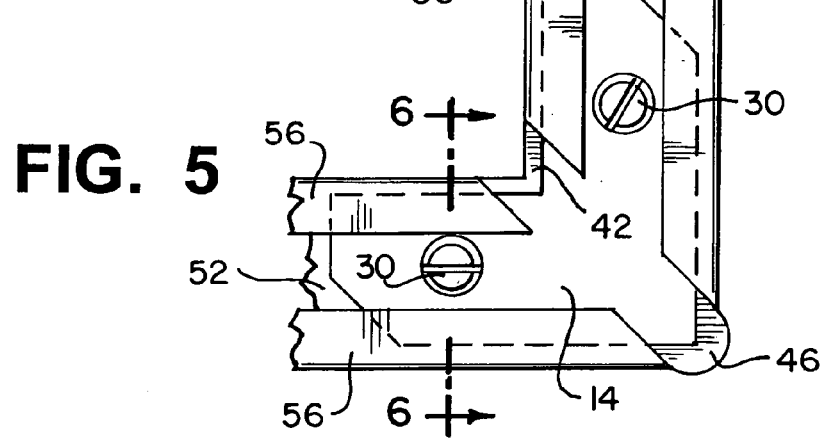
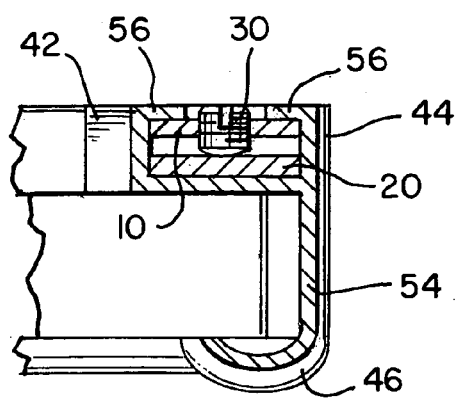

US 7,178,282 B2

1

DECORATIVE CORNER PIECE FOR CONNECTING MITERED FRAME SECTIONS TOGETHER

This application claims priority to U.S. provisional patent application No. 60/501,267, filed Sep. 9, 2003 which is incorporated herein by reference in its entirety.

The present invention relates to picture frames. In particular, this invention relates to a picture frame of the type comprising extruded aluminum frame sections which are mitered and locked together by means of L-shaped corner pieces.

BACKGROUND OF THE INVENTION

A picture frame in common use today is made of extruded aluminum frame sections, each of which includes a locking channel into which the legs of an L-shaped corner piece can be inserted. The corner piece includes two similarly shaped plates which are sometimes referred to as a tapped (threaded) upper plate and a backing plate. The tapped plate includes a threaded opening in each leg for receiving a screw which is accessible through an elongated slot in the back of a frame section. By tightening the screws the tapped plate and backing plate are forced apart thereby clamping the plates against opposing surfaces of the locking channels of two adjacent frame sections to lock the two frame sections together. The backing plate may be unconnected to the tapped plate, or the plates may be held together by means of an elastomeric adhesive applied at the junction of the legs which form the "L". The tapped plate is also known as a locking plate.

Conventional mitered frame corners have forty-five degree angled cut mitered edges at the junction of the frame sections, The forty-five degree angle of the frame section edges, when joined, form a perpendicular corner section of the frame. However, the angled edges of the mitered frame connections remain exposed to the viewer of the framed object even though the overall appearance of the frame corner section is rectangular.

The object of this invention is to provide a decorative corner piece that retains the function of joining mitered frame sections, while at the same time providing a cosmetic overlay to the mitered frame corners.

SUMMARY OF THE INVENTION

The present invention is directed to a picture frame comprising mitered metal frame sections joined together at each corner by a decorative corner piece. The decorative corner piece includes an L-shaped locking plate and an L-shaped backing plate, the backing plate including a cosmetic extension adapted to fit at the miter joint and cover the exposed miter corner. The cosmetic extension may be shaped so that it can wrap around the mitered corner. The decorative corner piece further includes screws which engage the locking plate and are adapted to bear against the backing plate. The screws function to separate the two plates, thereby locking the adjacent frame sections together.

2

Figure 1:
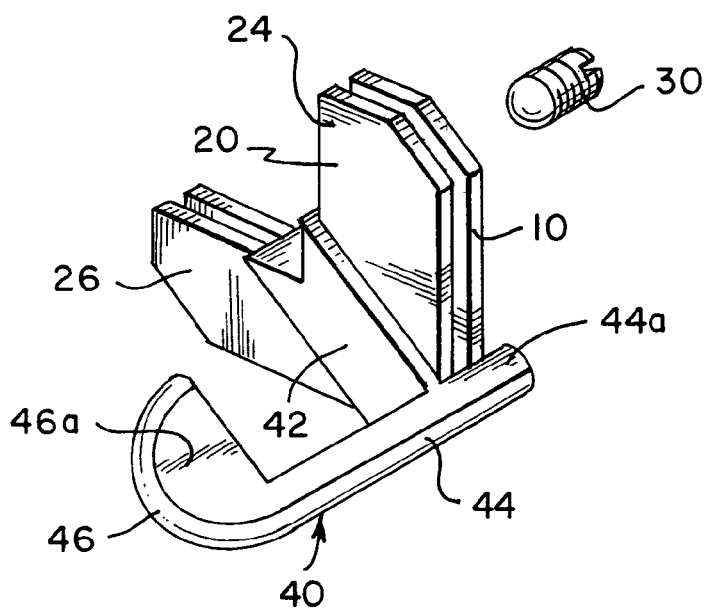
FIG. 1 is a perspective view showing a decorative corner piece in accordance with an embodiment of the present invention.
Figure 2:
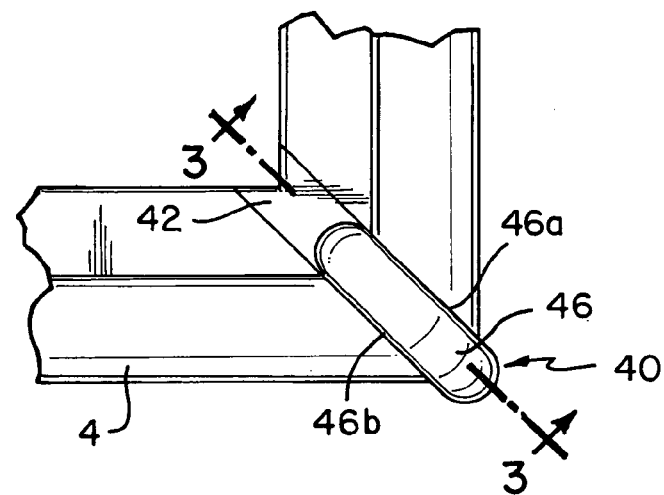
FIG. 2 is a top plan view showing the decorative corner piece of FIG. 1 in position in an assembled frame section.
Figure 3:
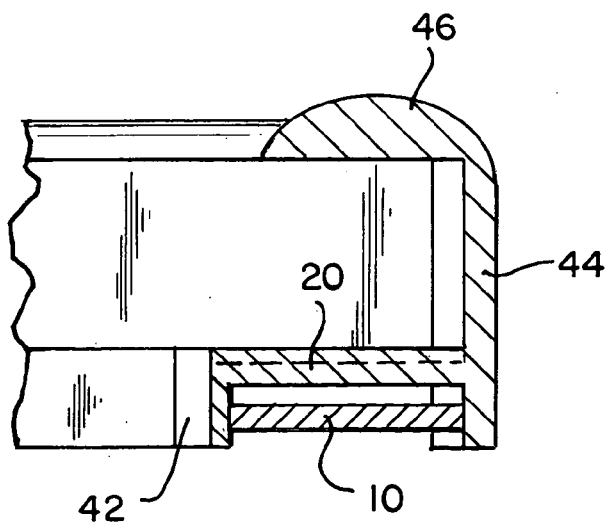

FIG. 3 is a cross sectional view of the decorative corner piece taken along line 3—3 of FIG. 2;

FIG. 4 is an exploded perspective view showing the decorative corner piece in accordance with an embodiment of the invention in combination with two mitered frame sections;

FIG. 5 is a top plan view of the back side of an assembled frame showing the decorative corner piece of FIG. 1 in position within the frame; and FIG. 6 is a cross sectional view taken along line 6—6 of FIG. 5.

DETAILED DESCRIPTION OF THE INVENTION

FIG. 1 illustrates, in perspective view, the decorative corner piece of the present invention. FIG. 4 illustrates a portion of a picture frame of the type with which the invention is intended to be used. An example of the metal picture frame is disclosed in U.S. Patent No. 6,339,891 to Cox, the contents of which are hereby incorporated by reference. Obviously, frame sections other than the one illustrated can be used with the invention. The illustrated picture frame comprises four frame sections 50, two of which are shown in FIG. 4. Each frame section is preferably extruded from aluminum and, as shown, includes an inwardly directing supporting flange 52, an outer wall 54, and a rearwardly opening locking track. The locking track is rectangular in cross section and includes two opposed lips 56 that are spaced apart to define an opening that extends the length of each section.

The ends of each section are mitered as illustrated at 60. Adjacent frame sections are joined together at their mitered ends and secured in place by the decorative corner piece 2. The decorative corner piece 2 includes an L-shaped locking plate 10 comprising legs 14 and 16 and an L-shaped backing plate 20 comprising legs 24 and 26. The L-shaped locking plate 10 and the L-shaped backing plate 20 may be unattached or they may be attached by an elastomeric adhesive.

The art work is retained within the frame between the supporting flange 52 and the curved surface of the outer wall 54. This basic construction is disclosed in U.S. Pat. No. 4,122,617 to Nielson, the contents of which are hereby incorporated by reference into this application.

The locking plate 10 includes threaded apertures 12 in each leg 14 and 16 for receiving respective screws 30. The ends of the two screws contact the backing plate 20 so that when the screws are threaded into the locking plate 10 of the decorative corner piece 2, the backing plate 20 is pushed away from the locking plate 10, causing the plates to engage opposing surfaces of the locking track 58 to lock the adjacent frame sections together.

The decorative corner piece 2 further includes a cosmetic extension 40 that is integrally connected to the backing plate 20 and extends perpendicularly away from the backing plate 20. Although the cosmetic extension 40 is described as being formed as an integral component of the backing plate 20, the extension 40 may be separately formed and then welded or connected using conventional fasteners to the backing plate 20. The cosmetic extension 40 includes a lateral member 42 that is integrally connected to the backing plate 20, as has just been described. The lateral member 42 is parallel to the plane of the backing plate 20. Extending perpendicularly from the lateral member 42 is an extension arm 44 having flattened sides 44a and 44b for engaging the sides of the mitered frame sections. The flattened sides of the extension arm 44 enable the connection point between the mitered portions 60 and the extension arm 40 to contact each other and form a visually smooth connection. Furthermore, the extension arm 40 causes a spacing to be defined between the two mitered sections of the frame. The spacing thus created allows for the cosmetic extension 40 and an arcuate-shaped portion 46 to be situated between the two mitered sections of the frame.

The arcuate-shaped portion 46 includes a rounded hemispherical surface 46*a* and a flat portion 48 (FIG. 4). The flat portion 48 is designed so that it is on a level plane with the inside of the frame which holds the art work in place. The flat portion 48 ensures that the art work remains properly situated within the frame in as level a position as is possible and, therefore, visually pleasing. The arcuate-shaped portion 46, like the extension arm 40, includes flattened sides 46*a* and 46*b* which contact the mitered portions 60 of the frame sections. The flattened sides 46*a* and 46*b* and miter portions 60 meet such that a smooth connection between those components is visible.

Alternatively, the cosmetic extension 40 may include a multitude of diverse shapes and designs for the previously described arcuate-shaped portion 46 so long as it includes flattened sides 46*a* and 46*b* that are adapted to mate with the frame sections. Specifically, that portion of the cosmetic extension may be rectangular in design, or even pyramidal in its shape. In fact, that portion may include an artistic relief design that overlays the arcuate-shaped portion 46, or it may be designed so that the relief design replaces the arcuate-shaped portion.

While the invention has been particularly shown and described with reference to the preferred embodiments thereof, it will be understood by those skilled in the art that various changes in form and details may be made therein without departing from the spirit and scope of the invention.

I claim:

1. A picture frame comprising four mitered frame sections, each section being joined to an adjacent section by a decorative corner piece, comprising:
    a locking plate bearing at least one threaded aperture for receiving a tightening screw;
    a backing plate spaced from said locking plate, whereby tightening of the screw forces the locking plate and backing plate apart; and
    a cosmetic extension attached to one of said plates, said extension adapted to fit between the mitered edges of adjacent frame sections, and including a top portion and a transverse extension arm which provide a cosmetic junction for adjacent frame sections.

2. A picture frame according to claim 1, wherein the cosmetic extension is attached to the backing plate.

3. A picture frame according to claim 2, wherein the top portion and transverse extension arm of the cosmetic extension include flat surfaces adapted to abut against the mitered edges of adjacent frame sections.

4. A picture frame according to claim 3, wherein the cosmetic extension includes a lateral member, said lateral member being attached to said backing plate and adapted to be placed between adjacent frame sections, said lateral member including flat surfaces for engaging the ends of said adjacent frame sections.

5. A rectangular frame, comprising
    four spaced apart mitered frame sections, and
    a decorative corner piece at each corner of the frame, each decorative corner piece comprising:
    a locking plate bearing at least one threaded aperture for receiving a tightening screw;
    a backing plate spaced from said locking plate and engageable by the tightening screw, whereby tightening of the screw forces the locking plate and the backing plate apart; and
    a cosmetic extension between the mitered edges of two adjacent frame sections and providing an ornamental effect in a corner of the frame, said cosmetic extension being attached to the backing plate, and including a top portion and a transverse extension arm, the top portion and extension arm including flat surfaces adapted to abut against the mitered edges of adjacent frame sections.

6. A frame according to claim 5, wherein the cosmetic extension includes a lateral member, said lateral member being attached to said backing plate and being spaced between adjacent frame sections, said lateral member including flat surfaces for engaging the ends of the respective frame sections.

* * * * *